Figure 1:
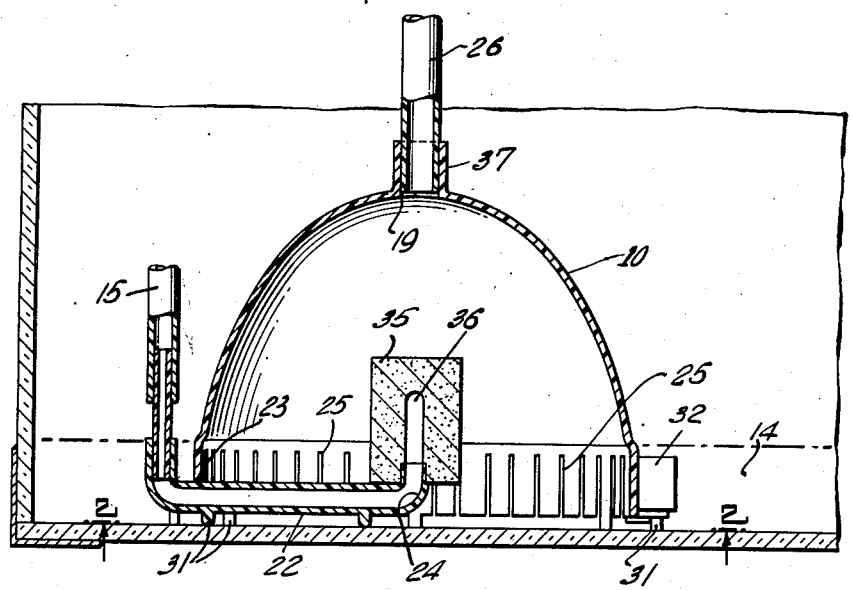

March 19, 1957 — L. STARK — 2,786,026
FILTER FOR TANKS

Filed April 27, 1955

2 Sheets-Sheet 1

INVENTOR
LUDWIG STARK.
BY
ATTORNEY

March 19, 1957     L. STARK     2,786,026
FILTER FOR TANKS
Filed April 27, 1955     2 Sheets-Sheet 2
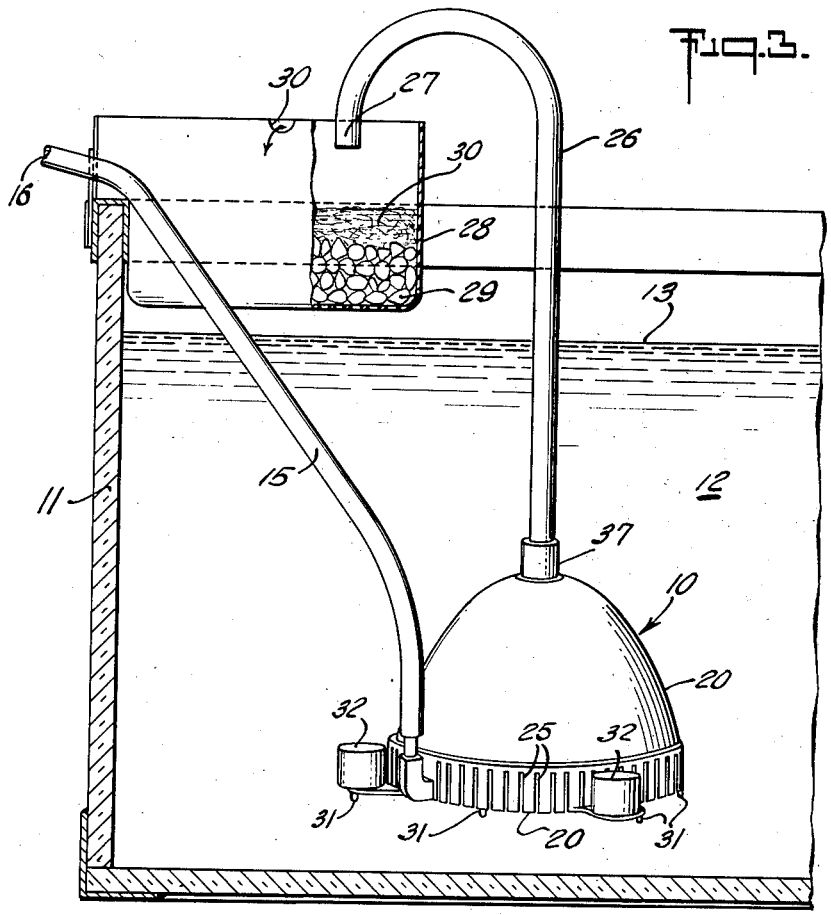
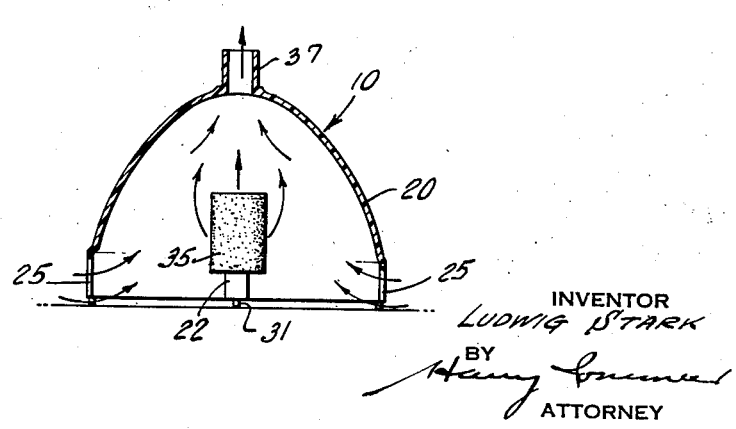
INVENTOR
LUDWIG STARK
BY
ATTORNEY

2,786,026
FILTER FOR TANKS
Ludwig Stark, Springfield, N. J.

Application April 27, 1955, Serial No. 504,225

2 Claims. (Cl. 210—16)

This invention relates to filtering devices such as are used for tanks containing a volume of liquid, a bed of comminuted particles, and a source of gas under pressure. The invention is adapted for use, for example, in connection with fish tanks, wherein a volume of water is placed in the tank, a bed of comminuted particles, such as sand, is disposed at the bottom of the tank, and a source of air under pressure is pumped into the tank. This reference to fish tanks is by way of example only of one of many practical applications of the device of this invention; as will become apparent from a consideration of the following specification and the accompanying drawings, the invention may be used in connection with tanks for other purposes.

In the device of this invention, the gas under pressure is directed upwardly through a large opening at the bottom of a hollow casing and toward a much smaller opening at the top thereof so as to "sweep" water upwardly from a point at the bottom of the casing (at the floor of the tank) and upwardly through the top opening of the casing. To further promote the sweeping action referred to, the lower end of the casing may be provided with plurality of slots or apertures, and may be provided with a plurality of spacer legs to space the casing from the floor of the tank.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

Figure 2:
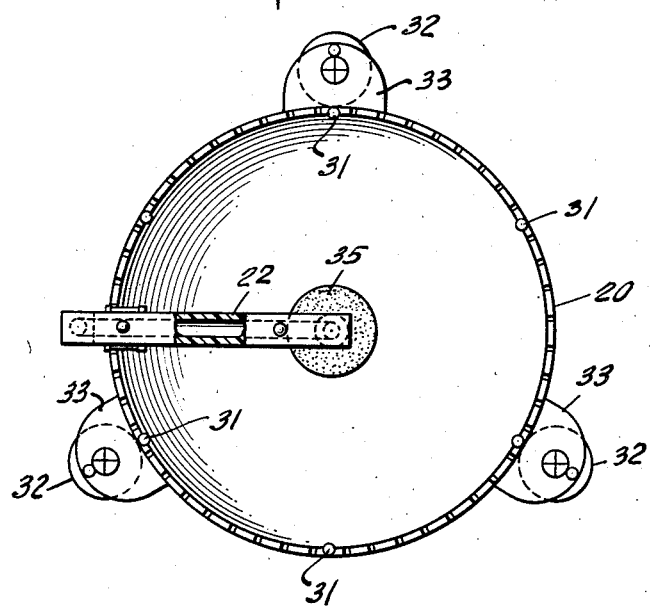

In the drawings:

Fig. 1 is a fragmentary vertical sectional view of a device embodying the invention, shown positioned in a tank, Fig. 2 is a bottom plan, partly fragmentary view thereof, taken on line 2—2 of Fig. 1, Fig. 3 is a vertical, sectional, partly perspective, view of the device of the invention shown positioned in a tank, and Fig. 4 is a schematic vertical sectional view thereof, to illustrate the "sweeping" action attained in the use of the invention.

As shown in the drawings, the device of this invention comprises a filter 10 for use in a tank 11 containing a volume of liquid 12 having a level 13, having a bed of comminuted particles 14, such as sand, and a source of gas under pressure, schematically illustrated in the drawings as the air pressure hose 15, which is connected beyond the broken end 16 shown in Fig. 3 to a pump (not shown) or other source of gas under pressure.

The filter 10 of this invention comprises a casing 20 (Fig. 1) adapted to be positioned in the tank at the bottom thereof and having a hollow interior terminating in the large opening 20 (Fig. 3) at the bottom thereof and in a much smaller opening 19 (Fig. 1) at the top of the casing. A pipe 22 is secured to the casing as at 23 (Fig. 1) and opens at one end 24 thereof interiorly of the casing below the small opening 19 at the top of the casing, so that, as gas under pressure is pumped through the pipe 22, said gas (as, for example, air bubbles) will flow upwardly in the casing and through the small opening 19 at the top of the casing, stimulating a flow of water from the bottom of the tank, through the casing and out of the small opening at the top thereof, as indicated by the arrows in Fig. 4. To enhance this sweeping action, the lower end of the casing may be provided with a plurality of slots or apertures 25. The slots or apertures 25 of the lower end of the casing are preferably proportioned to extend for a substantial portion of the height of the bed 14. A tube 26 may be secured to the casing in line with the small opening 19 at the top of the casing, to direct the flow of air and liquid upwardly from the said small opening 19, through the tube 26 and out of the downwardly bent end portion 27 of the tube. Liquid discharged from said downwardly bent portion 27 may be passed through a device 28 which may be interposed between the downwardly bent portion 27 and the water level 13, and which may contain filtering or additive media 29, 30. The purifying device 28 shown in Fig. 3 of the drawings, is one of an infinite variety of such devices with which the invention may be successfully used.

A plurality of spacer legs 31 may be provided extending from the lower edge of the casing, to space the same from the floor of the tank, as shown in Fig. 1, to enhance the sweeping action above mentioned, so that not only will the tank liquid be swept through the bed 14 of comminuted particles but also the bed and floor of the tank will be swept in operation of the device. The casing 10 may be weighted by suitable means, such as by making the casing of inherently heavy material, or, as shown in Figs. 2 and 3, by securing a plurality of weight members 32 to said casing, or to extensions 33 thereof. A filtering stone 35 may be secured to the free end of the pipe 22 and provided with a recess 36 therein with which the free end 24 of the pipe 22 communicates, as shown in Fig. 1. The casing 10 is preferably semispherical in cross section, as shown in Fig. 1, and may be provided at the top thereof with a fitting 37 aligned with the small opening 19 for connection of one end of tube 26 therewith in registry with said opening 19.

Having thus described my invention, what I claim as new and desire to secure by Letters Patent is:

1. A filter for use in tanks containing a volume of liquid, a bed of comminuted particles on the floor of said tank and a source of gas under pressure, said filter comprising a casing having a large opening co-extensive with the bottom thereof and a smaller opening at the top thereof, and being completely hollow intermediate the openings, said casing having a plurality of slots along the entire lower end thereof extending upwardly of the lower edge thereof and to a point upwardly along the casing substantially co-extensive with the entire height of the bed when the casing is positioned in the bed at the bottom of the tank for facilitating flow of water through the entire thickness of the bed and thence through said slots and casing, and means to connect the source of gas with the interior of the casing.

2. In a filter as set forth in claim 1, said slots in the casing being spaced and parallel equidistantly around the lower end of the casing.

References Cited in the file of this patent

UNITED STATES PATENTS

| 2,275,428 | Holdeman | Mar. 10, 1942 |
| 2,533,936 | Holmes et al. | Dec. 12, 1950 |
| 2,674,574 | Pettas | Apr. 6, 1954 |
| 2,676,921 | Vansteenkiste | Apr. 27, 1954 |
| 2,744,065 | Lacey | May 1, 1956 |

FOREIGN PATENTS

| 241,893 | Great Britain | Sept. 30, 1926 |